United States Patent [19]

Lutes

[11] Patent Number: 5,005,312
[45] Date of Patent: Apr. 9, 1991

[54] DISPOSABLE MOUSE TRAP

[76] Inventor: Richard E. Lutes, P.O. Box 144, Tiskilwa, Ill. 61368

[21] Appl. No.: 563,297

[22] Filed: Aug. 6, 1990

[51] Int. Cl.⁵ .......................................... H01M 23/18
[52] U.S. Cl. ....................................................... 43/61
[58] Field of Search .................................... 43/60, 61

[56] References Cited

U.S. PATENT DOCUMENTS

| 253,907 | 2/1882 | Andre | 43/61 |
| 2,437,020 | 3/1948 | Ford | 43/61 |
| 4,763,459 | 8/1988 | Smith | 43/61 |

Primary Examiner—Richard K. Seidel
Assistant Examiner—Jeanne M. Eldel
Attorney, Agent, or Firm—Irving Faber

[57] ABSTRACT

A disposable mouse trap that could be reused, if desired, suitable for attracting a mouse within a cylindrical container or compartment having a closed end and an open-end, by placing food or other type of bait within the cylindrical compartment wherein when the mouse enters the cylindrical chamber to obtain the food, a spring released lever shuts behind the mouse enclosing it within the cylindrical compartment, suffocating the mouse. The deceased mouse and the trap are easily disposed of, without the necessity of removing the dead mouse from the trap, or viewing the dead or dying mouse. The trap can be reused by pressing down on the spring loaded lever reopening the open end of the cylindrical container, enabling the mouse to be disposed of into the garbage and the trap reused.

5 Claims, 1 Drawing Sheet

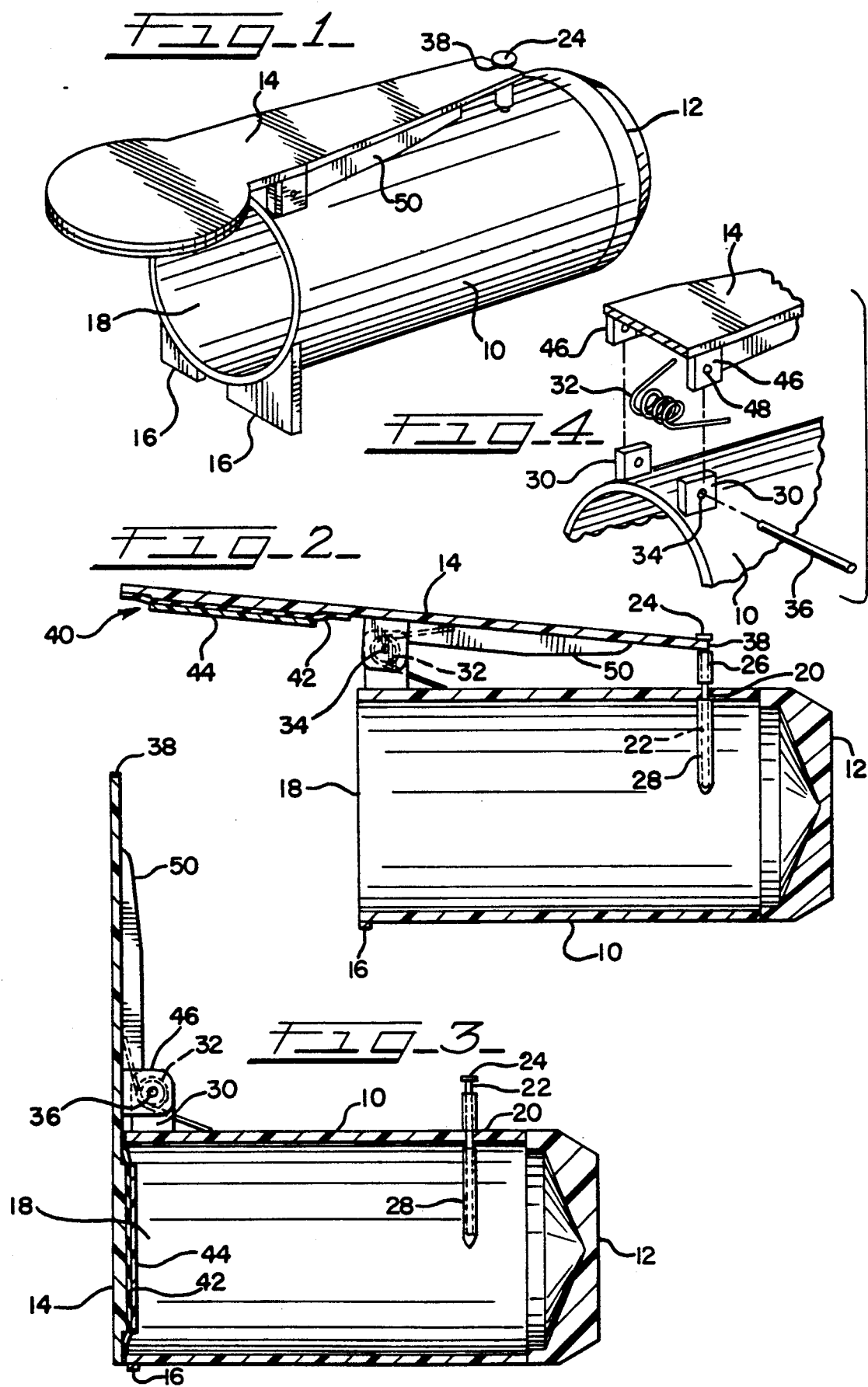

DISPOSABLE MOUSE TRAP

BACKGROUND OF INVENTION

In today's society, with urban blight, and the like, there is still a need for mouse traps. Even with the modernization of sanitation facilities, education via the respective communication medias, mice are still a problem, especially in blighted areas, as well as in new developments where field mice are prevalent and have infiltrated new homes.

Existing mouse traps basically leave the person placing the traps with the job of removing the trap and the dead mouse, which is not ones favorite thing. Most people are queasy when dealing with a live mouse, let alone a dead one. The fact is that most people not only don't want to physically handle a dead mouse, they don't even want to see it. Therefore there is a need for an efficient disposable mouse trap that can be easily disposed of without viewing the dead mouse.

My invention consists of an opaque cylindrical compartment or chamber having a closed and an open end. A pin extending through a wall of the cylindrical chamber is positioned adjacent the closed end. A spring loaded lever arm is coupled to the pin at one end thereof by means of a semi-circular groove; the other end of the lever arm being of a configuration suitable for closing the open end of the cylindrical compartment once the trap is activated. In essence, the trap is activated by placing a piece of food or bait on the pin within and near the closed end of the cylindrical compartment. The mouse is attracted by the smell of the food or bait and is lured into the cylindrical compartment or chamber. As the mouse approaches the food or bait on the pin, the mouse releases the spring loaded arm closing the open end of the cylindrical compartment thereby trapping the mouse within the compartment causing the mouse to suffocate to death.

It is easy to determine if the trap has been activated by visual examination. If the open end of the cylindrical compartment is closed the trap has been activated indicating a mouse is trapped within the cylindrical compartment, at which time the trap is picked up and disposed of in the garbage. If the trap was inadvertently set-off, it would be easy to determine by picking it up. If there is no mouse within the cylindrical compartment, it will weigh substantially less than if a mouse was in it. If the trap was inadvertently set-off, or if one wanted to reuse the trap, it can be reset and reused. The opaqueness of the cylinder avoids viewing the dead or dying mouse by the person removing the trap.

The trap may be reused, if desired, by simply pressing down on the spring loaded lever arm thereby re-opening the open end of the cylindrical compartment and disposing of the dead mouse into the garbage or other suitable place.

It becomes a matter of choice of the person setting the trap as to whether the trap and mouse should be disposed of or just the dead mouse.

BRIEF SUMMARY OF INVENTION

It is the primary object of my invention to provide a disposable mouse trap that eliminates the necessity of viewing or handling the dead mouse.

It is another object of my invention to provide an inexpensive and efficient disposable mouse trap.

It is another object of my invention to provide a mouse trap that is able to kill a mouse without leaving blood stains on a carpet or floor.

It is another object of my invention to provide a mouse trap that will kill a mouse by suffocation.

It is another object of my invention to provide a mouse trap that can be disposed of with the dead mouse therein, or be reused.

IN THE DRAWINGS

FIG. 1 illustrates a perspective view of my disposable mouse trap.

FIG. 2 illustrates a side view of my disposable mouse trap with the spring loaded lever arm in a cocked position.

FIG. 3 illustrates a side view of my disposable mouse trap after the spring loaded lever arm has been activated.

FIG. 4 is a break-a-way view illustrating the positioning of the spring to the lever arm and the cylindrical compartment.

DESCRIPTION OF PREFERRED EMBODIMENT

This invention relates to a new and useful disposable mouse trap that enables one to dispose of it without viewing the dead or dying mouse.

The disposable mouse trap illustrated in the drawings one through four is comprised of a cylindrical compartment or chamber 10 having an end cap 12 positioned and attached to one end of the cylindrical compartment 10 and a spring activated lever arm 14.

The cylindrical compartment 10 has two open ends and is made of plastic or other suitable material and preferably is opaque; however, it may be clear or semi-opaque. If opaque, one would not be able to see the dead or dying mouse. If clear or semi-opaque one would be able to see within the cylindrical compartment 10 to see if, in fact, a mouse is trapped within, or if the cylindrical compartment 10 is empty indicating that the trap was inadvertently activated. The opening of the cylindrical compartment is of a diameter large enough to allow a mouse to easily enter the open end thereof and move toward the closed end.

The end cap 12 is of the same or similar material as the cylindrical compartment 10 and is secured to one of the open ends thereof by friction or other means well known in the art, enabling said end cap to be removed by either twisting or pulling it from the cylindrical compartment 10.

A pair of stabilizing elements 16 are attached to the open end 18 of the cylindrical compartment 10 to stabilize the cylindrical compartment 10 on a horizontal surface. The stabilizinq elements 16 are of the same or similar material as the cylindrical compartment 10 and are secured thereto by a plastic glue or other means well known in the art.

Adjacent the end of the cylindrical compartment 10 to which the end-cap 12 is affixed is a pin aperture 20 of a diameter sufficient to enable a pin 22 having a head 24 to be positioned therethrough. A pin sleeve 26 suitable for receiving the pin is positioned between the pin head 24 and the exterior of the cylindrical compartment 10 over the pin aperture 20. Food or bait, 28 well known in the art for attracting mice and readily available in the market, is attached to the pin 22 within the cylindrical compartment 10 by removing the end cap 12, placing the bait on the pin 22, then replacing the end-cap 12.

A pair of spring holding tabs 30 are positioned adjacent the open end 18 of the cylindrical compartment 10, opposite the pin aperture 20, for positioning therebetween a spring 32 having two ends approximately 180° apart, said spring being well known in the art and readily available in the market. The spring holding tabs 30 each have an aperture 34 suitable for receiving a spring holding pin 36.

The spring activated lever 14 is of an irregular shape having at one end thereof a semi-circular groove 38 suitable for engaging the pin 22 between the pin head 24 and the pin sleeve 26 and at the opposite end thereof, a semi-circular configuration suitable for securely fitting over the open end 18 of the cylindrical compartment 10 when the lever arm 14 is activated. When the lever arm 14 is not activated it is at a slight angle to the horizontal, whereas once it is activated it is in a vertical position. An air lock closure 40 is positioned and affixed to the semi-circular configuration end of the lever arm 14 to prevent air from entering the cylindrical compartment 10. The air lock closure 40 is comprised of a circular disc 42, preferably of the same material as the cylindrical compartment 10 and a felt or similar type material 44. The circular disc 42 and the felt material 44 are attached to the circular configuration end of the lever arm 14 by glue or other suitable means well known in the art.

A pair of lever arm tabs 46 are attached to the lever arm 14 each having an aperture 48 positioned therein suitable for receiving the spring holding pin 36. The lever arm tabs 46 are positioned on the lever arm 14 so as to be adjacent the spring holding tabs 30; the spring holding tab apertures 34 and the lever arm tab apertures 48 are aligned to enable the spring holding pin 36 to pass therethrough. When a mouse touches the bait 28 at the end of the pin 22, the pin is disengaged from the semi-circular groove 38, enabling the semi-circular end of the lever arm 14, by means of the spring 32, to seal the open end of the cylindrical compartment 10.

The spring 32 is positioned between the spring holding tabs 30, one end of the spring abutting the exterior of the cylinder 10, the other end of the spring abutting the underside of the lever 14, as illustrated in FIGS. 2, 3 and 4.

The lever arm 14 has a pair of spring retention elements 50 attached to the lever arm 14, running along the underside of the lever arm 14 from the lever arm tabs 46 toward the semi-circular groove 38 by glue or other suitable means well known in the art. The spring retention elements 50 are of the same or similar material as the cylindrical compartment 10. The spring retention elements keep the end of the spring 32 adjacent the underside of the lever arm 14 from slipping away from the underside of the lever arm.

The lever arm 14 is coupled to the cylindrical chamber 10 by positioning the semi-circular groove 38 into the pin 20 between the pin head 24 and the pin sleeve 26 and aligning the lever arm tab apertures 48 with the spring holding tab apertures 34; the spring pin 36 is positioned through the apertures 34 and 48, the spring 32 being positioned between the spring holding tabs 30. A suitable capping means, not illustrated, but well known in the art is coupled to each end of the spring holding pin 36 to prevent the pin 36 from sliding out of the apertures 34 and 48.

In essence the trap is positioned in an area where there is a problem with mice. A piece of food or other type of bait 28, well known in the art, is positioned on the tip of pin 22 within the cylindrical compartment 10. When a mouse is attracted by the food or other type of bait, it moves the pin 22 which disengages the spring loaded lever arm 14 from the semi-circular groove 38 snapping the semi-circular end of the lever arm 14 against the open end 18 of the cylindrical compartment 10, trapping the mouse therein. The air lock closure 40 keeps air from seeping into the cylindrical compartment 10, thereby suffocating the mouse.

The mouse and trap may be disposed of together, or if the trap is to be reused again, the dead mouse is released from the cylindrical compartment 10 by pushing down on the spring loaded lever arm 14, and disposing of the dead mouse into the garbage or other suitable place. If the trap is to be reused, the end-cap 12 is removed from the cylindrical compartment 10, new bait is placed on pin 22 and the end cap 12 being repositioned into the cylindrical compartment.

It is understood that the above described disposable mouse trap is simply illustrative of the application of principles of my invention, and many other modifications, including the use of other materials and means for coupling the various elements together, may be made without departing from the spirit and scope of my invention.

I claim:

1. A disposable mouse trap comprising:
   a cylindrical compartment having two open ends;
   an end cap coupled to one of the open ends of the cylindrical compartment closing said end;
   a pin having a head positioned through the cylindrical compartment adjacent its closed end, the head of the pin being outside the cylindrical compartment;
   bait attached to the end of the pin within the cylindrical compartment;
   a lever arm having a semi-circular groove at one end suitable for engaging the pin, the other end having a semi-circular configuration suitable for closing the other open end of the cylindrical compartment when the lever arm is activated;
   a pair of spring holding tabs coupled adjacent to the open end of the cylindrical compartment and, positioned parallel to each other, each tab having an aperture therein;
   a spring having two ends, said spring being positioned between said spring holding tabs;
   a pair of lever arm tabs coupled to the underside of the lever arm adjacent the semi-circular end thereof, the tabs being parallel to each other and, each tab having an aperture therethrough;
   a spring holding pin coupling the spring to the spring holding tabs, and the lever arm tabs, the pin passing through the apertures of the spring holding tabs and the lever arm tabs, wherein one end of the spring abuts the underside of the lever arm and the other end of the spring abuts the cylindrical compartment so that when a mouse activates the pin, the lever arm is disengaged from the pin and the spring snaps the lever arm from a semi-horizontal position to a vertical position sealing the open end of the cylinder.

2. A disposable mouse trap as defined in claim 1 wherein said mouse trap further comprises a pair of spring retention elements coupled to the underside of the lever arm adjacent the lever arm tabs, said elements preventing the end of the spring abutting the underside of the lever arm from slipping from the underside of the lever arm.

3. A disposable mouse trap as defined in claim 2 further comprising an air-lock closure coupled to the semi-circular end of the lever arm, said air-lock closure sealing the open end of the cylindrical compartment when the lever arm is activated, closing the air supply to the cylindrical container, suffocating the mouse.

4. A disposable mouse trap as defined in claim 3 wherein the air lock closure comprises a circular disc and felt material attached thereto each of a diameter to seal the open end of the cylindrical container.

5. A disposable mouse trap as defined in claim 4 wherein said trap further comprises a pair of stabilizing elements coupled to the cylindrical container for stabilizing the mouse trap on a horizontal surface.

* * * * *